United States Patent Office 2,735,327
Patented Feb. 21, 1956

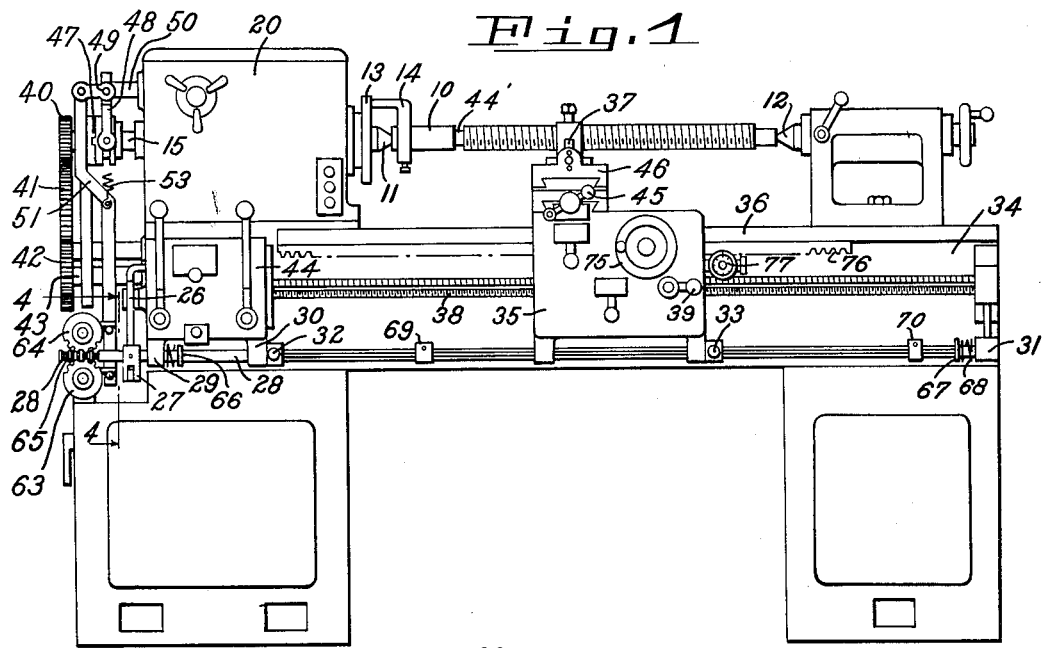

2,735,327
AUTOMATIC THREAD STOP MECHANISM

Eugene L. Ritter, Cincinnati, Ohio, assignor to The Cincinnati Milling Machine Co., Cincinnati, Ohio, a corporation of Ohio Application November 12, 1952, Serial No. 319,903

2 Claims. (Cl. 82—21)

This invention relates to thread cutting machines such as lathes and the like, and more particularly to an automatic thread stop mechanism for such machines.

In the cutting of threads on threading lathes with single point tools it is necessary to quickly withdraw the tool from the work when the end of the thread has been reached to prevent overrun and possible spoilage of the work. This operation requires quick maneuvering on the part of the operator, even when cutting external threads, but it becomes more difficult when cutting internal threads especially in blind holes. It is, therefore, an object of the present invention to eliminate the present difficulties and to provide an improved automatic thread stop device to facilitate threading operations.

Other objects and advantages of the present invention should be readily apparent by reference to the following specification, considered in conjunction with the accompanying drawing forming a part thereof, and it is to be understood that any modifications may be made in the exact structural details there shown and described, within the scope of the appended claims, without departing from or exceeding the spirit of the invention.

Referring to the drawings in which like reference numerals indicate like or similar parts:

Figure 1 is a front elevation of a machine embodying the principles of this invention.

Figure 2 is an end view of the machine as viewed from the left end of Figure 1.

Figure 3 is a detail view on the line 3—3 of Figure 2.

Figure 4 is a detail view on the line 4—4 of Figure 1.

Figure 5 is a detail view on the line 5—5 of Figure 2.

In Figure 1 of the drawings there is shown a conventional lathe supporting a work piece 10 to be threaded between centers 11 and 12 and operatively connected to a rotatable face plate 13 by the conventional driving dog 14. The face plate 13 is attached to the end of the headstock spindle 15 which, in turn, is driven from a prime mover, such as a motor 16, shown in Figure 2 through suitable mechanism. The motor 16 is operatively connected by a belt 17 to a drive pulley 18 supported for rotation on the end of a shaft 19 journaled in the headstock 20, and a start and stop clutch 21 is provided for connecting and disconnecting the pulley to the shaft for rotation of the spindle 15 through conventional gearing in the headstock.

The clutch shifter 21' is secured to a support shaft 22 which is connected by a bell crank 23 to a link 24 whereby vertical movement of the link up or down will oscillate the clutch shifter 21' to engage or disengage the clutch. The link 24 is connected by a centrally pivoted crank 25 to a second link 26 which, as shown in Figure 4, is connected by a crank arm 27 to a control shaft 28. This shaft is rotatably mounted in fixed bearings 29, 30, and 31 attached to the front of the bed 34 of the machine.

The shaft 28 has operating handles 32 and 33 splined thereon whereby the shaft may be rotated to engage or disengage the spindle drive clutch 21. The operating handle 33 is carried by and movable with the tool carriage 35 which is suitably guided on ways 36 formed on the bed and for moving a threading tool 37 carried thereby relative to the work. For threading operations, the tool carriage is operatively connected to a lead screw 38 by means of a conventional half nut, not shown, which is mounted in the tool carriage and operated by a control lever 39 whereby the half nut may be opened or closed with respect to the screw. The lead screw is supported at opposite ends for rotation on the front of the bed, and it is now obvious that if the lead screw is rotated in predetermined ratio to the rate of rotation of the work that a thread of a predetermined number of threads per inch may be cut on the work piece.

To make possible the cutting of a variety of threads, the usual set of change gears are provided between the headstock spindle 15 and the lead screw 38 to vary the rate of rotation of the latter with respect to the spindle. For illustrative purposes, a conventional set of change gears 40, 41, and 42 are shown in Figure 2, the gear 40 being supported by the spindle 15, and the gear 42 being supported on the shaft 43 which is operatively connected by conventional gearing, not shown, in the gear box 44 to the lead screw 38. It will now be obvious that if the lead screw 38 is rotated simultaneously with the work spindle that the threading tool will be moved at a predetermined rate to the work to cut a thread, but when the tool reaches the groove 44' in the work where the thread ends, it is necessary for the operator to quickly rotate the handle 45 mounted on the carriage 35 to withdraw the tool slide 46, and thus withdraw the tool from the work. This must be done to prevent overrun, even although the operator stops the feed of the tool carriage at this point, as a matter of safety.

By means of this invention an automatic stop mechanism is provided which may be preset to insure that the carriage feed is stopped at exactly the right place so that the operator can withdraw the tool without haste or damage to the work. This is accomplished in part by providing a one tooth clutch mechanism, indicated generally by the reference numeral 47 in Figure 1 which serves to operatively connect the spindle 15 to the drive gear 40 of the change speed mechanism. This clutch mechanism includes a shifter fork 48 which is pivotally supported at 49 on a projecting arm 50 of the headstock 20. The shifter fork 48 has a depending operating crank arm 51. As shown in Figure 2, a spring 53 is connected at one end to a pin 54 projecting from the arm 51, and at the other end to a pin 55 which forms the pivot of the shifter arm whereby the spring operates through the crank arm 51 to maintain the clutch 47 in engagement.

The arm 51 extends downward adjacent the spline rod 28 and is provided with two pins 56 and 57 as shown in Figure 3. These pins are normally held in engagement with operating arms 58 and 59 by the spring 53 which are mounted on the end of independent shafts 60 and 61 respectively. The shafts 60 and 61 extend through the bracket 62 shown in Figure 2 and have secured to their opposite ends partial gear members 63 and 64, which intermesh with circular rack teeth 65 formed on the free end of the shaft 28.

The shaft or rod 28 is not only supported for rotatable adjustment but is also capable of axial movement in its bearings and, therefore, is provided with collars 66 and 67 at opposite ends adjacent the bearing members 29 and 31. Springs 68 are mounted between the collars and bearings which are sufficiently equalized to hold the rod 28 in substantially an intermediate position. The rod may be provided with dogs such as 69 and 70, which may be adjustably positioned along the rod for engagement by the tool carriage 35 whereby when the carriage 35 is traveling to the left as viewed in Figure 1 it will engage the dog 69 and shift the rod against the compression of spring 66 and rotate the gear members 63 and 64 in opposite directions. Under these conditions the arm 58 shown in Figure 3 will move in a counterclockwise direction while the arm 59 will move in a clockwise direction and thereby through the agency of the pin 57 effect disengagement of the one tooth clutch.

If, for any reason, the thread is being cut on the work piece by moving the tool carriage 35 to the right as viewed in Figure 1, the carriage will engage the dog 70 and again effect shifting of the rod 28 but this time to the right against the compression of the spring 68 engaging the collar 67 and cause rotation of the gear members 63 and 64. However, this time the arm 58 will move in a clockwise direction while the arm 59 will move in a counterclockwise direction, but the movement of the shifter rod 52 will still be the same because the arm 58 will act through the agency of the pin 56 to again effect disengagement of the clutch. It will, therefore, be apparent that no matter which way the carriage is being fed the automatic stop mechanism will operate to effect disengagement of the clutch and thereby stop rotation of the feed screw 38.

To steady the lower end of the rod 51 it is mounted in a rectangular guide slot 71 formed in the projecting arm 72 of the bracket 62 and the slot is closed by a keeper 73 which is fastened to the arm 72 by a screw or other suitable means 74. It will be noted that when the carriage 35 has moved to the left, for instance, against the dog 69 and thereby shifted the one tooth clutch out of engagement to stop rotation of the feed screw 38 that the parts are more or less locked up and the one tooth clutch cannot be reengaged until the carriage 35 has been moved to the right a sufficient distance to provide the ncessary clearance to allow the springs to shift the rod 28 back to its intermediate position.

This has to be accomplished by the operator disengaging the half nuts by means of the control lever 39 and then by use of the hand wheel 75 which is operatively connected to the rack bar 76 in the usual manner, the carriage may be manually moved to its starting position. It is necessary, however, that when the half nuts are reengaged that the threading tool does not get out of step with the thread which it is cutting and so the carriage is provided with a conventional chasing dial 77 having a worm gear, not shown, in operative engagement with the lead screw 38 in the usual manner. Thus, when the operator has returned the carriage to its starting position and reset the cross slide 46 for the next cut, he utilizes the chasing dial to tell when to reengage the half nuts with the lead screw and since the lead screw cannot get out of step with the work driving spindle due to the one tooth clutch, the parts are synchronized for the next chasing operation.

There has thus been provided an improved automatic thread stop mechanism which is effective for either internal or external thread cutting operations to stop the movement of the tool carriage selectively at any point along the axis of the work, which allows the operator sufficient time to retract the chasing tool from the work and which automatically resets itself as the tool carriage returns to its starting position.

What is claimed is:

1. In a lathe having a bed, a headstock mounted thereon and a lead screw journaled on the bed for driving a tool carriage, the combination with a power driven spindle in said headstock, of a one-tooth clutch for operatively connecting said spindle to said lead screw, a control rod mounted on the bed for axial movement, a pair of levers supported on the bed for opposite rotation in response to axial movement of the rod in either direction, a shifter arm for said one-tooth clutch, said levers having a lost motion connection to said shifter arm whereby one direction of axial movement of the rod will cause one lever to actuate said shifter in a prescribed direction, and the other direction of axial movement of said rod will cause the other lever to move said shifter in the same prescribed direction.

2. In a lathe having a bed, a headstock thereon, a tool carriage slidably mounted on the bed and a lead screw for driving said carriage, the combination with a power operable spindle journaled in the headstock, of a one-tooth clutch for operatively connecting said spindle to said lead screw, resilient means normally maintaining engagement of said one-tooth clutch, a control rod mounted on the bed for axial movement, resilient means acting on the rod to centralize its position axially, a pair of levers supported by the bed for opposite rotation in response to axial movement of the rod in either direction, a shifter arm for said one-tooth clutch, said levers having a lost motion connection to said shifter arm whereby one direction of axial movement of the rod will cause one lever to actuate said shifter arm in a prescribed direction, and the other direction of axial movement of said rod will cause the other lever to move said shifter in the same prescribed direction, and dog means on the rod for engagement by the carriage in either direction of movement to effect axial movement of the rod and thereby diesngagement of said one-tooth clutch.

References Cited in the file of this patent

UNITED STATES PATENTS

| | | |
|---|---|---|
| 216,537 | Skinner | June 17, 1879 |
| 549,006 | Norton | Oct. 29, 1895 |
| 684,432 | Isler | Oct. 15, 1901 |
| 834,359 | Buckley | Oct. 30, 1906 |
| 1,052,279 | Runge | Feb. 4, 1913 |
| 1,282,819 | Hanson | Oct. 29, 1918 |
| 2,129,280 | Lange | Sept. 6, 1938 |
| 2,404,228 | Hamlin | July 16, 1946 |